(12) United States Patent
Nguyen et al.

(10) Patent No.: US 7,272,704 B1
(45) Date of Patent: Sep. 18, 2007

(54) HARDWARE LOOPING MECHANISM AND METHOD FOR EFFICIENT EXECUTION OF DISCONTINUITY INSTRUCTIONS

(75) Inventors: Hung Nguyen, Plano, TX (US); Shannon Wichman, McKinney, TX (US)

(73) Assignee: VeriSilicon Holdings (Cayman Islands) Co. Ltd., Santa Clara, CA (US)

( * ) Notice: Subject to any disclaimer, the term of this patent is extended or adjusted under 35 U.S.C. 154(b) by 289 days.

(21) Appl. No.: 10/844,941

(22) Filed: May 13, 2004

(51) Int. Cl.
*G06F 9/44* (2006.01)

(52) U.S. Cl. .................. 712/241; 712/233; 712/234

(58) Field of Classification Search ......... 712/241, 712/233, 234
See application file for complete search history.

(56) References Cited

U.S. PATENT DOCUMENTS

| | | | | |
|---|---|---|---|---|
| 4,556,063 A | * | 12/1985 | Thompson et al. | ............ 607/32 |
| 4,858,115 A | * | 8/1989 | Rusterholz et al. | ............ 712/7 |
| 5,524,223 A | * | 6/1996 | Lazaravich et al. | ......... 712/241 |
| 6,766,444 B1 | * | 7/2004 | Singh et al. | ................ 712/241 |

* cited by examiner

*Primary Examiner*—Donald Sparks
*Assistant Examiner*—Vincent Lai

(57) ABSTRACT

A hardware looping mechanism and method is described herein for handling any number and/or type of discontinuity instruction that may arise when executing program instructions within a scalar or superscalar processor. For example, the hardware looping mechanism may provide zero-overhead looping for branch instructions, in addition to single loop constructs and multiple loop constructs (which may or may not be nested). Zero-overhead looping may also be provided in special cases, e.g., when servicing an interrupt or executing a branch-out-of-loop instruction. In addition to reducing the number of instructions required to execute a program, as well as the overall time and power consumed during program execution, the hardware looping mechanism described herein may be integrated within any processor architecture without modifying existing program code.

20 Claims, 8 Drawing Sheets

| EXAMPLE #1: | LOOP: |
| --- | --- |
| | i0 |
| | i1 |
| | agn0 LOOP |

| Cycle | F/D | GR | RD | EX | WB | OPERATIONS |
| --- | --- | --- | --- | --- | --- | --- |
| n | i0<br>i1 | | | | | First iteration: first two loop instructions enter the instruction decoder in the F/D stage. |
| n+1 | *agn0* | i0<br>i1 | | | | A discontinuity instruction (agn0) is detected in the F/D stage: set LIP[0] bit; update LBR and LER. |
| n+2 | i0<br>*i1* | *agn0* | i0<br>i1 | | | Second iteration: forward agn0 to GR stage; decrement loop count; if last loop instr. is detected in F/D stage, set EOB[0] bit; if loop count = 0, fetch PC=LER+2, else fetch PC=LBR. |
| n+3 | i0<br>*i1* | i0<br>*i1* | agn0 | i0<br>i1 | | Third iteration: forward EOB[0] to GR stage; decrement loop count; if last loop instr. is detected in F/D stage, set EOB[0]; if loop count = 0, fetch PC=LER+2, else fetch PC=LBR. |
| n+4 | i0<br>*i1* | i0<br>*i1* | i0<br>i1 | agn0 | i0<br>i1 | Fourth iteration: forward EOB[0] to GR stage; decrement loop count; if last loop instr. is detected in F/D stage, set EOB[0]; if loop count = 0, fetch PC=LER+2, else PC=LBR. |
| n+x | ... | ... | ... | ... | ... | Continue until loop count = 0, then fetch PC=LER+2 and clear LIP[0] bit. |

*FIG. 7*

| EXAMPLE #1: | LOOP:<br>　i0<br>　i1<br>　agn0 LOOP | | | | | |
|---|---|---|---|---|---|---|
| Cycle | F/D | GR | RD | EX | WB | OPERATIONS |
| n | i0<br>i1 | | | | | First iteration: the first two loop instructions enter the instruction decoder in the F/D stage. |
| n+1 | agn0 | i0<br>i1 | | | | A discontinuity instruction (agn0) is detected in the F/D stage; end of first iteration. |
| n+2 | i0<br>i1 | agn0 | i0<br>i1 | | | Second iteration: forward agn0 to GR stage; decrement loop count; if loop count = 0, fetch the next instr. after loop, else fetch the first instr. in the loop. |
| n+3 | agn0 | i0<br>i1 | agn0 | i0<br>i1 | | The discontinuity instruction (agn0) is detected again in the F/D stage; end of second iteration. |
| n+4 | i0<br>i1 | agn0 | i0<br>i1 | agn0 | i0<br>i1 | Third iteration: forward agn0 to GR stage; decrement loop count; if loop count = 0, fetch the next instr. after loop, else fetch the first instr. in the loop. |
| n+5 | agn0 | i0<br>i1 | agn0 | i0<br>i1 | agn0 | The discontinuity instruction (agn0) is detected again in the F/D stage; end of third iteration. |
| n+6 | i0<br>i1 | agn0 | i0<br>i1 | agn0 | i0<br>i1 | Fourth iteration: forward agn0 to GR stage; decrement loop count; if loop count = 0, fetch the next instr. after loop, else fetch the first instr. in the loop. |
| n+x | ... | ... | ... | ... | ... | Continue until loop count = 0, then fetch the next instr. after loop. |

*FIG. 8*
*(PRIOR ART)*

| EXAMPLE #2: | mov %loop0, 2<br>mov %loop1, 2<br><br>OUTER_LOOP:<br>　i0<br>　i1<br>　INNER_LOOP:<br>　　i2<br>　　i3<br>　　agn0 INNER_LOOP<br>　agn1 OUTER_LOOP |
|---|---|

*FIG. 9A*

| Cycle | F/D | GR | RD | EX | WB | OPERATIONS |
|---|---|---|---|---|---|---|
| n | i0<br>i1 | | | | | First two loop instructions enter the instruction decoder in the F/D stage. |
| n+1 | i2<br>i3 | i0<br>i1 | | | | First two loop instructions forwarded to GR stage; second two loop instructions enter the F/D stage. |
| n+2 | *agn0*<br>agn1 | i2<br>i3 | i0<br>i1 | | | A first discontinuity instruction (agn0) is detected in the F/D stage: set LIP[0] bit; update LBR and LER. |
| n+3 | i2<br>*i3* | *agn0* | i2<br>i3 | i0<br>i1 | | Forward agn0 to GR stage; decrement inner loop counter; if last inner loop instr. detected in F/D stage; set EOB[0] bit; if loop count = 0, fetch PC=LER+2, else PC=LBR. |
| n+4 | i2<br>*i3* | i2<br>*i3* | agn0 | i2<br>i3 | i0<br>i1 | Forward EOB[0] to GR stage; decrement inner loop counter; if last inner loop instr. detected in F/D stage; set EOB[0] bit; if loop count = 0, fetch PC=LER+2, else PC=LBR. |
| n+5 | *agn1* | i2<br>*i3* | i2<br>i3 | agn0 | i2<br>i3 | A second discontinuity instruction (agn1) is detected in the F/D stage: forward EOB[0] to GR stage; reinitialize inner loop counter; clear LIP[0]; set LIP[1]; update LRB and LER. |
| n+6 | i0<br>i1 | *agn1* | i2<br>i3 | i2<br>i3 | agn0 | Forward agn1 to GR stage; decrement outer loop counter. |
| n+7 | i2<br>i3 | i0<br>i1 | agn1 | i2<br>i3 | i2<br>i3 | |
| n+8 | *agn0*<br>agn1 | i2<br>i3 | i0<br>i1 | agn1 | i2<br>i3 | The first discontinuity instruction (agn0) is detected in the F/D stage: clear AIP[1], set AIP[0]; update LBR and LER. |
| n+9 | i2<br>*i3* | *agn0* | i2<br>i3 | i0<br>i1 | agn1 | Forward agn0 to GR stage; decrement first loop counter; if last inner loop instr. detected in F/D stage; set EOB[0] bit; if loop count = 0, fetch PC=LER+2, else PC=LBR. |
| n+10 | i2<br>*i3* | i2<br>*i3* | agn0 | i2<br>i3 | i0<br>i1 | Forward EOB[0] to GR stage; decrement first loop counter; if last inner loop instr. detected in F/D stage; set EOB[0] bit; if loop count = 0, fetch PC=LER+2, else PC=LBR. |
| n+11 | *agn1* | i2<br>*i3* | i2<br>i3 | agn0 | i2<br>i3 | Forward EOB[0] to GR stage; reinitialize first loop counter; clear LIP[0]. A second discontinuity instruction (agn1) is detected in the F/D stage: set LIP[1]; update LRB and LER. |
| n+12 | i0<br>i1 | *agn1* | i2<br>i3 | i2<br>i3 | agn0 | Forward agn1 to GR stage; decrement outer loop counter. |
| n+13 | i2<br>i3 | i0<br>i1 | agn1 | i2<br>i3 | i2<br>i3 | |
| n+x | ... | ... | ... | ... | ... | Continue until outer loop count = 0, then fetch PC=LER+2 and clear LIP[1] bit. |

*FIG. 9B*

HARDWARE LOOPING MECHANISM AND METHOD FOR EFFICIENT EXECUTION OF DISCONTINUITY INSTRUCTIONS

BACKGROUND OF THE INVENTION

1. Field of the Invention

This invention relates to processor design and, more particularly, to a hardware looping mechanism configured to provide zero-overhead looping when executing any number and/or type of discontinuity instruction.

2. Description of the Related Art

The following descriptions and examples are not admitted to be prior art by virtue of their inclusion within this section.

A typical processor involves various functional units that receive instructions from, for example, memory and operate on those instructions to produce results that are stored back into the memory or dispatched to an input/output device. To operate on a single instruction, a processor may fetch and decode the instruction, assemble its operands, perform the operations specified by the instruction and write the results back to memory. The execution of instructions may be controlled by a clock signal, whose period may be referred to as the "processor cycle time".

The amount of time taken by a processor to execute a program may be determined by several factors including: (i) the number of instructions required to execute the program, (ii) the average number of processor cycles required to execute an instruction, and (iii) the processor cycle time. Processor performance may be improved by reducing one or more of the above-mentioned factors. For example, processor performance is often increased by overlapping the steps of multiple instructions, using a technique called "pipelining." To pipeline instructions, the various steps of instruction execution are performed by independent units called "pipeline stages". The result of each pipeline stage is communicated to the next pipeline stage via a register (or latch) arranged between two stages. In most cases, pipelining reduces the average number of cycles required to execute an instruction by permitting the processor to handle more than one instruction at a time.

Many types of pipelined processors are currently available. For example, some processors may be classified as either complex-instruction-set computer (CISC) or reduced-instruction-set computer (RISC) processors. In CISC architectures, processor performance may be improved by reducing the number of instructions required to execute a program, while increasing the average number of cycles taken to decode and execute the (densely encoded) instructions. On the other hand, RISC architectures attempt to improve processor performance by reducing the number of cycles taken to execute an instruction, while allowing some increase in the total number of instructions. Though CISC and RISC architectures may improve processor performance to some degree, they are often limited to issuing only one instruction into the pipeline at a time. Such processors are referred to herein as "single-issue" or "scalar" processors.

Superscalar processors have been developed to reduce the average number of processor cycles per instruction (beyond what was possible in pipelined, scalar processors) by allowing concurrent execution of instructions in the same pipeline stage, as well as concurrent execution of instructions in different pipeline stages. Instead of issuing only one instruction per processor cycle, "superscalar" or "multi-issue" processors were given multiple pipelines, so that two or more instructions could be fed through the pipeline stages in parallel. The number of instructions that can be issued into the pipeline at any one time is often referred to as the "issue width" of the processor. In most cases, multi-issue processors may execute approximately 2 to N instructions at a time.

Other architectures attempting to improve performance by exploiting instruction parallelism include very-long-instruction-word (VLIW) processors and super-pipelined processors. VLIW processors increase processor speed by scheduling instructions in software rather than hardware. In addition, VLIW and superscalar processors can each be super-pipelined to reduce processor cycle time by dividing the major pipeline stages into sub-stages, which can then be clocked at a higher frequency than the major pipeline stages. As used herein, the term "superscalar processors" will be considered to include superscalar processors, VLIW processors and super-pipelined versions of each.

Many electronics devices are now embedded with digital signal processors (DSPs), or specialized processors that have been optimized to handle signal processing algorithms. DSPs may be implemented as either scalar or superscalar architectures, and may have several features in common with RISC-based counterparts. However, the differences between DSP and RISC architectures tend to be most pronounced in the processors' computational units, data address generators, memory architectures, interrupt capabilities, looping hardware, conditional instructions and interface features.

An efficient looping mechanism, in particular, is often critical in digital signal processing applications because of the repetitive nature of signal processing algorithms. In order to minimize the execution time required for looping, some DSP architectures may support zero-overhead loops by including dedicated internal hardware, otherwise referred to as a "hardware looping mechanism." These hardware looping mechanisms may be included for monitoring loop conditions and to decide—in parallel with all other operations—whether to increment the program counter, or branch without cycle-time penalty to the top of the loop. Unlike conventional RISC processors, which may implement a "test-and-branch" at the end of every loop iteration, DSP architectures with zero-overhead looping mechanisms require no additional instructions to determine when a loop iteration has been completed.

Zero-overhead looping mechanisms are currently provided in a variety of scalar DSP architectures. For example, some DSP architectures may provide zero-overhead looping on a single instruction (using, e.g., a REPEAT loop construct) or on multiple instructions (using, e.g., a DO loop construct). However, these looping mechanisms provide extremely limited flexibility, in that they apply only to loop instructions and not to other discontinuity instructions, such as conditional branch instructions (like the BNZ or "branch if not zero" instruction). As used herein, a "discontinuity instruction" may refer to any instruction that diverts program control away from the next instruction immediately following the discontinuity instruction in program sequence. In addition, currently available looping mechanisms do not allow branch instructions to be placed near the end of a loop, nor do they allow program control to branch back into the loop if another discontinuity instruction is encountered outside of the loop. These constraints further limit the flexibility of currently available hardware looping mechanisms.

To date, the inventors are unaware of any zero-overhead looping mechanisms currently available for use within superscalar processors. Instead, a branch-style looping construct, referred to as the Again (AGN) instruction, is often used to determine whether a loop iteration has been completed. In conventional architectures, the AGN instruction is re-issued into the pipeline for each new iteration of the loop. Unfortunately, re-issuing the AGN instruction reduces the issue width of multi-issue processors by consuming at least one instruction slot for each iteration of the loop.

Therefore, a need exists for an improved zero-overhead looping mechanism for both scalar and superscalar processor architectures. Such a looping mechanism would provide true zero-overhead looping by maintaining a maximum issue width at all times. In addition to loop instructions, an improved looping mechanism could be applied to other types of discontinuity instructions, such as conditional branch instructions. An improved looping mechanism would also be configured to support substantially any number of nested loops, in addition to hardware/software interrupts and other branch instructions that cause program control to be diverted outside of the loop.

SUMMARY OF THE INVENTION

The problems outlined above may be in large part addressed by an improved hardware looping mechanism and method for handling any number and/or type of discontinuity instruction that may arise when executing program instructions within a scalar or superscalar processor. As used herein, a "discontinuity instruction" may refer to a loop instruction or a conditional branch instruction. Likewise, the term "superscalar" may be used to refer to a multi-issue, a very-long-instruction-word (VLIW), or a super-pipelined processor architecture. If included within a multi-issue processor, the hardware looping mechanism may support substantially any issue width and/or number of pipeline stages.

As one advantage, the hardware looping mechanism described herein may provide zero-overhead looping for branch instructions, in addition to single loop constructs and multiple loop constructs (which may or may not be nested). The hardware looping mechanism may also provide zero-overhead looping in special cases, e.g., when servicing an interrupt or executing a branch-out-of-loop instruction. In addition to reducing the number of instructions required to execute a program, as well as the overall time and power consumed during program execution, the hardware looping mechanism described herein may be integrated within any processor architecture without modifying existing program code.

In one embodiment, a method is provided for executing discontinuity instructions within a processor. The method may be performed, at least in part, by the improved hardware looping mechanism described herein. In general, the method may include the steps of issuing one or more program instructions at a time into a first pipeline stage, and detecting whether a first discontinuity instruction is included among the issued program instructions. If the first discontinuity instruction is detected, the method may execute the instructions associated with the first discontinuity instruction until a last instruction is detected and marked with an end-of-branch flag. The instructions associated with the first discontinuity instruction may be re-executed during subsequent iterations upon detection of the end-of-branch flag.

In some embodiments, the end-of-branch flag may be stored within an instruction queue along with the last instruction. In doing so, the end-of-branch flag may essentially replace the discontinuity instruction, in subsequent iterations of the loop, by signaling the completion of a loop iteration. The number of instructions required to execute a program may be greatly reduced by tagging the last instruction with the end-of-branch flag. In other words, processor performance may be increased by limiting the number of times the discontinuity instruction is re-issued into the pipeline during subsequent iterations of the loop.

In some cases, the step of re-executing may be performed without having to re-issue the first discontinuity instruction back into the pipeline. This may be especially advantageous when executing highly repetitive program sequences, such as those performing signal processing algorithms. Regardless, the method may improve processor performance by avoiding unnecessary reductions in the processor issue width. In other words, the method may allow a processor to issue the maximum number of instructions that can be issued into the pipeline during a single pipeline cycle.

In other cases, the first discontinuity instruction may be re-issued into the pipeline to re-activate the hardware looping mechanism in special situations, e.g., after servicing an interrupt or executing a branch-out-of-loop instruction. As such, the hardware looping mechanism may provide uncommon flexibility by allowing program control to branch in and out of a loop without adverse affects. Conventional looping mechanisms fail to provide such flexibility.

After the step of detecting and prior to the step of executing, the method may include storing a branch-in-progress flag within a first register, a branch-begin address within a second register, a branch-end address within a third register, and a loop count within a fourth register. The branch-in-progress flag, the branch-begin address and the branch-end address may be dynamically updated during the steps of executing and re-executing, if necessary. For example, the branch-end address may be cleared from the third register if program control is diverted outside of the loop before the last iteration of the loop is complete (e.g., if a branch-out-of-loop instruction is executed). When program control returns to the loop, the branch-end address may be updated within the third register upon detecting the discontinuity instruction for a second time. Allowing the registers to be dynamically updated may provide the flexibility for handling special situations.

During the step of re-executing, the method may clear the end-of-branch flag within the instruction queue, decrement the loop count within the fourth register, and fetch the branch-begin address from the second register. Next, the method may issue one or more instructions, which are pointed to by the branch-begin address and associated with the first discontinuity instruction, into the first pipeline stage. The method may then detect whether the last instruction is included among the issued instructions. If the last instruction is detected, the step of re-executing may repeat the steps of clearing the end-of-branch flag, decrementing the loop count, fetching the branch-begin address and issuing one or more instructions, until the loop count is exhausted.

The preceding discussion assumes that the first discontinuity instruction is a loop instruction. Though this may not always be the case (the first discontinuity instruction may, instead, be a branch instruction), the assumption will be maintained to describe how the method may handle nested loops and branch-out-of-loop instructions. In other words, we may examine the case in which the method detects the presence of a second discontinuity instruction among the issued program instructions.

If a second discontinuity instruction is detected and determined to be a nested loop instruction, the method may execute the nested instructions associated with the second discontinuity instruction until a last instruction of the nested instructions is detected and marked with a second end-of-branch flag. The method may re-execute subsequent iterations of the nested instructions upon detecting the second end-of-branch flag and without re-issuing the second discontinuity instruction into the first pipeline stage.

However, if a second discontinuity instruction is detected and determined to be a conditional branch instruction, the method may determine whether to maintain or deactivate the hardware looping mechanism. Such determination may be generally dependent on: (i) whether the second discontinuity instruction diverts program control to an instruction within, or outside of, the instructions associated with the first branch instruction, and (ii) whether or not the second discontinuity instruction is the last instruction in the loop.

A processor having an instruction unit capable of decoding at least one program instruction per pipeline cycle is also provided herein. In general, the instruction unit may include an instruction decoder, an instruction queue and branch logic. The instruction decoder may receive the program instructions, decode the program instructions, and detect whether a first discontinuity instruction is included among the decoded instructions. The decoded instructions may be stored within the instruction queue. If a first discontinuity instruction is detected among the decoded instructions, however, the instruction decoder may mark one of the decoded instructions with an end-of-branch flag to indicate that a last instruction has been detected by the instruction decoder. The branch logic may be generally configured for maintaining a maximum issue width of the processor for all subsequent iterations of the first discontinuity instruction.

If the first discontinuity instruction is detected, the branch logic may store a branch-in-progress flag within a first register of the branch logic, a branch-begin address within a second register of the branch logic, and a branch-end address within a third register of the branch logic. The branch logic may also determine the number of iterations associated with the first discontinuity instruction. The number of iterations may be stored within a fourth register of the branch logic as a loop count. In some embodiments, a copy of the loop count may be stored within a fifth register of the branch logic for automatically reloading the fourth register once the loop count is exhausted.

In some cases, the branch logic may allow a second discontinuity instruction to be included among a plurality of instructions associated with the first discontinuity instruction. The second discontinuity instruction may be a nested loop or branch instruction. In some cases, the second discontinuity instruction may be the last instruction of the plurality of instructions associated with the first discontinuity instruction. In some embodiments, the branch logic may be further configured for allowing any number of discontinuity instructions to be included among the plurality of instructions associated with the first discontinuity instruction.

In some cases, the second discontinuity instruction may be a branch-out-of loop instruction, and may divert program control outside of the plurality of instructions before a last iteration of the plurality of instructions has been completed. In this case, the branch logic may clear the branch-in-progress flag stored within the first register of the branch logic. Once program control returns to the second discontinuity instruction, a next set of program instructions may be issued to the instruction decoder beginning with the instruction immediately following the second discontinuity instruction in program sequence. The instruction decoder may decode the next set of program instructions to determine whether or not the first discontinuity instruction is included among the decoded instructions.

If the first discontinuity instruction is detected among the decoded instructions for a second time, the branch logic may repeat the steps of storing the branch-in-progress flag, the branch-begin address, the branch-end address and the loop count. Thus, the first, second, third and fourth registers within the branch logic may be dynamically reloaded once the first discontinuity instruction is detected for the second time. The instruction queue may also re-tag the last instruction with the end-of-branch flag, once the last instruction is again detected by the instruction decoder.

A computer system having at least one processor coupled thereto for executing a plurality of program instructions is also provided herein. In general, the processor may include a plurality of pipeline stages configured for receiving at least one program instruction at a time, and branch logic configured for handling the execution of discontinuity instructions in a highly efficient manner. In some embodiments, the branch logic may enable a first discontinuity instruction to be issued into a first pipeline stage no more than one time for all iterations of the plurality of program instructions, if no other discontinuity instructions exist within a set of program instructions associated with the first discontinuity instruction.

However, the branch logic may be configured for handling more than one discontinuity instruction, in other embodiments of the invention. For example, if the first discontinuity instruction corresponds to an outer loop and a second discontinuity instruction (existing within the set of program instructions) corresponds to an inner loop, the branch logic may allow the second discontinuity instruction to be issued into the first pipeline stage no more than one time per iteration of the outer loop. Alternatively, or in addition to the implicit execution of the second discontinuity instruction, the branch logic may allow the first discontinuity instruction to be issued into the first pipeline stage no more than one time per iteration of the outer loop.

BRIEF DESCRIPTION OF THE DRAWINGS

Other objects and advantages of the invention will become apparent upon reading the following detailed description and upon reference to the accompanying drawings in which:

FIG. 7 is a table illustrating one manner in which exemplary program instructions (e.g., a tight loop) may be forwarded through various pipeline stages, in accordance with the method described herein;

FIG. 8 is a table illustrating how the same program instructions may be forwarded through various pipeline stages, in accordance with a conventional method; and FIGS. 9A and 9B are a table illustrating another manner in which exemplary program instructions (e.g., a nested loop) may be forwarded through various pipeline stages, in accordance with the method described herein.

Figure 1:
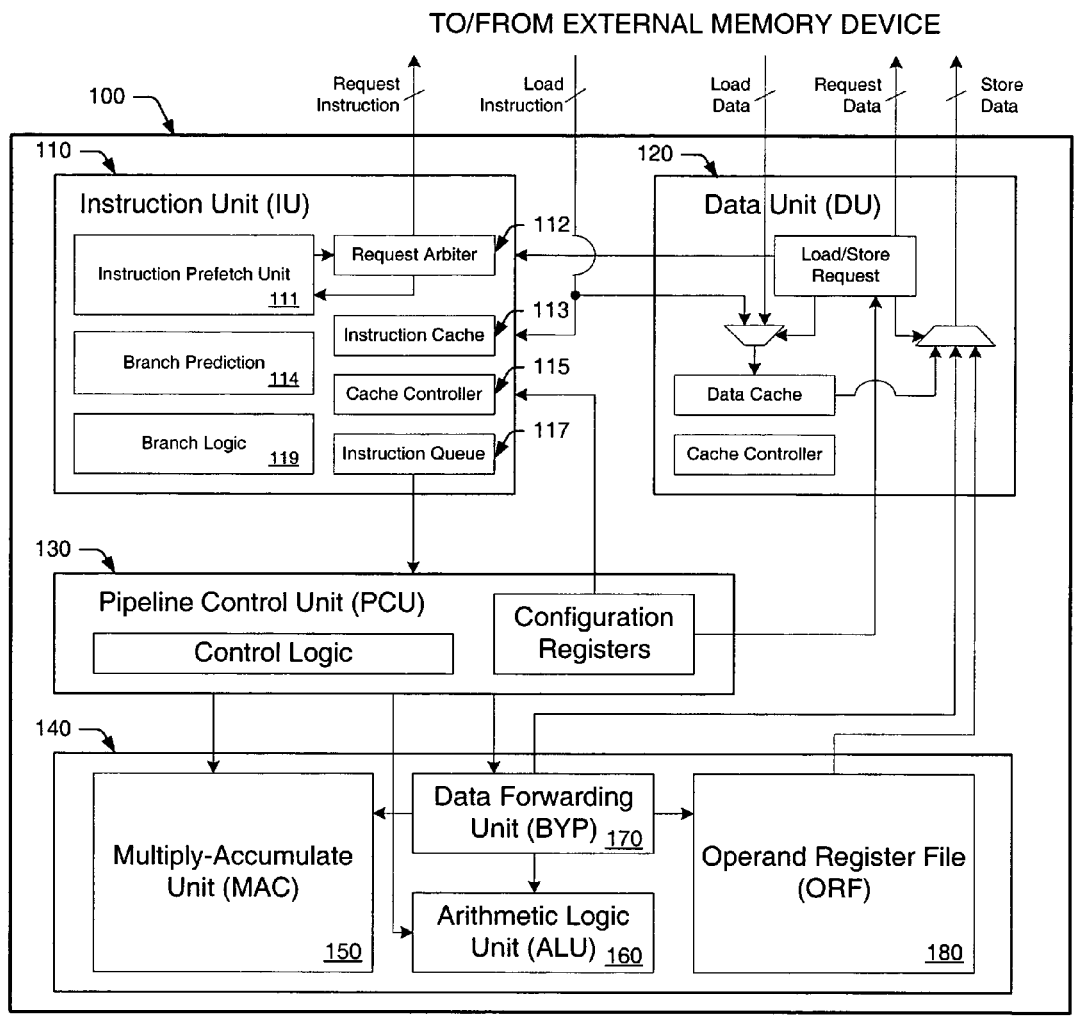
FIG. 1 is a block diagram illustrating one embodiment of a processor core that may include the efficient hardware looping mechanism described herein.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning to the drawings, exemplary embodiments of an improved hardware looping mechanism will be described in reference to FIGS. 1-7 and 9-10. FIG. 1 illustrates one embodiment of a processor core 100 that may incorporate the improved hardware looping mechanism described herein. As shown in FIG. 1, processor core 100 may comprise various functional units, such as instruction unit (IU) 110, data unit (DU) 120, pipeline control unit (PCU) 130 and execution unit (EU) 140. Execution unit 140 may include one or more multiply-accumulate units (MAC) 150, one or more arithmetic logic units (ALU) 160, a data forwarding or bypass unit (BYP) 170 and an operand register file (ORF) 180. Other functional units may be included depending on the exact architecture of processor core 100.

In some cases, processor core 100 may be included within a scalar or superscalar digital signal processor (DSP), due to the need of such processors for highly efficient hardware looping mechanisms. In one embodiment, for example, DSP core 100 may be provided by LSI Logic Corporation, a common assignee herewith. As such, processor core 100 may support up to six instructions per cycle at a peak rate of 300 MHz (or four instructions/cycle at a peak of 400 MHz) with a fully static 5- to 8-stage pipeline design. Depending on the particular configuration, DSP core 100 may also include up to four MACs and up to four ALUs. In some cases, processor core 100 may also include up to two (or more) Address Generation Units (AGU) for performing arithmetic operations on addresses, and an Address Register File (ARF) for storing address pointers and providing temporary storage. Conditional execution of multiple blocks of instructions may also be supported by processor core 100. It is noted, however, that the above specifications are provided as examples only. Processor core 100 should not be limited to only those DSP cores provided by LSI Logic Corporation or the exemplary specifications mentioned above.

In addition, the hardware looping mechanism provided herein should not be limited to DSP architectures in all embodiments of the invention. In some embodiments, for example, the hardware looping mechanism may be applied to other scalar or superscalar processor architectures, such as general-purpose microcontrollers, general-purpose microprocessors, vector processors, etc. The following discussion focuses on implementing an improved hardware looping mechanism within a 4-issue, superscalar DSP architecture with a 5-stage pipeline design, for the sake of brevity only.

Figure 2:
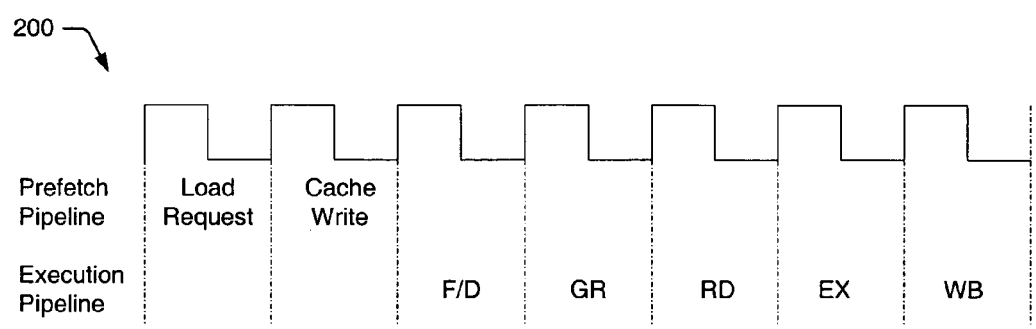
FIG. 2 is a timing diagram illustrating exemplary pipeline stages within the processor core of FIG. 1.

A timing diagram of a typical 5-stage pipeline (200) is shown in FIG. 2. Reference will now be made to FIGS. 1 and 2 to illustrate how program instructions may be operated on throughout various stages of pipeline 200, and the core components responsible for performing such operation. As shown in FIG. 1, instruction unit 110 may include instruction prefetch unit 111, instruction cache 113 and cache controller 115. Before program instructions can be issued into the execution pipeline, instruction prefetch unit 111 may request that one or more program instructions be sent from an external (or "off-chip") memory device via request arbiter 112 (during a "load request" stage of the prefetch pipeline). Since the program instructions will be written to instruction cache 113 (during a "cache write" stage of the prefetch pipeline), the number of instructions requested may be dependent on the number of cache lines available within instruction cache 113. Once the prefetch pipeline is initialized, the cached instructions may be issued into the execution pipeline (or simply "pipeline") up to N instructions at a time for an N-issue superscalar processor.

During the fetch and decode (F/D) stage, instruction unit 110 retrieves one or more instructions from instruction cache 113, decodes the instructions, and places the decoded instructions into instruction queue 117. Prefetch unit 111 is responsible for retrieving the cached instructions in a manner that minimizes program stalls. For example, prefetch unit 111 continuously looks ahead in the program stream and, in most cases, retrieves instructions from memory one cache line at a time. Prefetch unit 111 may also check the cache contents against the upcoming instructions in the program stream. If a requested instruction already exists in cache 113, the prefetch unit may use the cached instruction instead of re-fetching the instruction from memory, which may advantageously reduce the amount of power consumed by the processor core. In some cases, prefetch unit 111 may utilize static or dynamic branch prediction logic 114 and other prefetch techniques to minimize cache miss penalties and reduce pipeline stalls. In general, dynamic branch prediction provides higher accuracy than static branch prediction, but at the expense of greater design complexity, chip area, and power consumption.

The use of cached instructions may be particularly useful when executing signal processing algorithms. For example, DSP programs typically execute in tight loops, or relatively small sets of program instructions that are repeatedly executed. By storing the loop instructions in the instruction cache, the amount of power consumed by the processor core may be significantly reduced by reducing the number of accesses made to the external memory. As described in more detail below, processor performance may be further improved by providing an efficient mechanism (e.g., branch logic 119) for handling the loop instructions. Such a mechanism may be used to provide zero-overhead branching for loop instructions, as well as other discontinuity instructions, such as conditional branch instructions.

During the grouping (GR) stage, the decoded instructions stored within instruction queue 117 may be sent to pipeline control unit (PCU) 130 where the instructions are checked for pipeline hazards, such as data and resource dependencies. In a superscalar architecture, PCU 130 may also group the decoded instructions before dispatching the instructions, in parallel, to data forwarding unit (BYP) 170 and other execution units, such as data unit (DU) 120, multiply-accumulate units (MAC) 150, and arithmetic logic units (ALU) 160. Though grouping may not be required in scalar architectures, PCU 130 may still check for pipeline hazards before dispatching the instructions to the other units.

During the read (RD) stage, the data forwarding unit or "bypass unit" (BYP) 170 reads the operand register file (ORF) 180 and sends the contents of specific registers to one or more of the execution units—DU 120, MAC 150 and ALU 160—for execution during the execution stage. Functional unit bypassing may also be performed in the RD stage. Bypassing allows a functional unit to access the result of the previous instruction without waiting for the result to be written back to the operand register file during the write-back stage. During the read (RD) stage, the execution units may decode the instruction opcode to determine the operation to be performed in the execution (EX) stage. The results generated in the EX stage may then be written back to the ORF 180 in the write-back (WB) stage.

Figure 3:
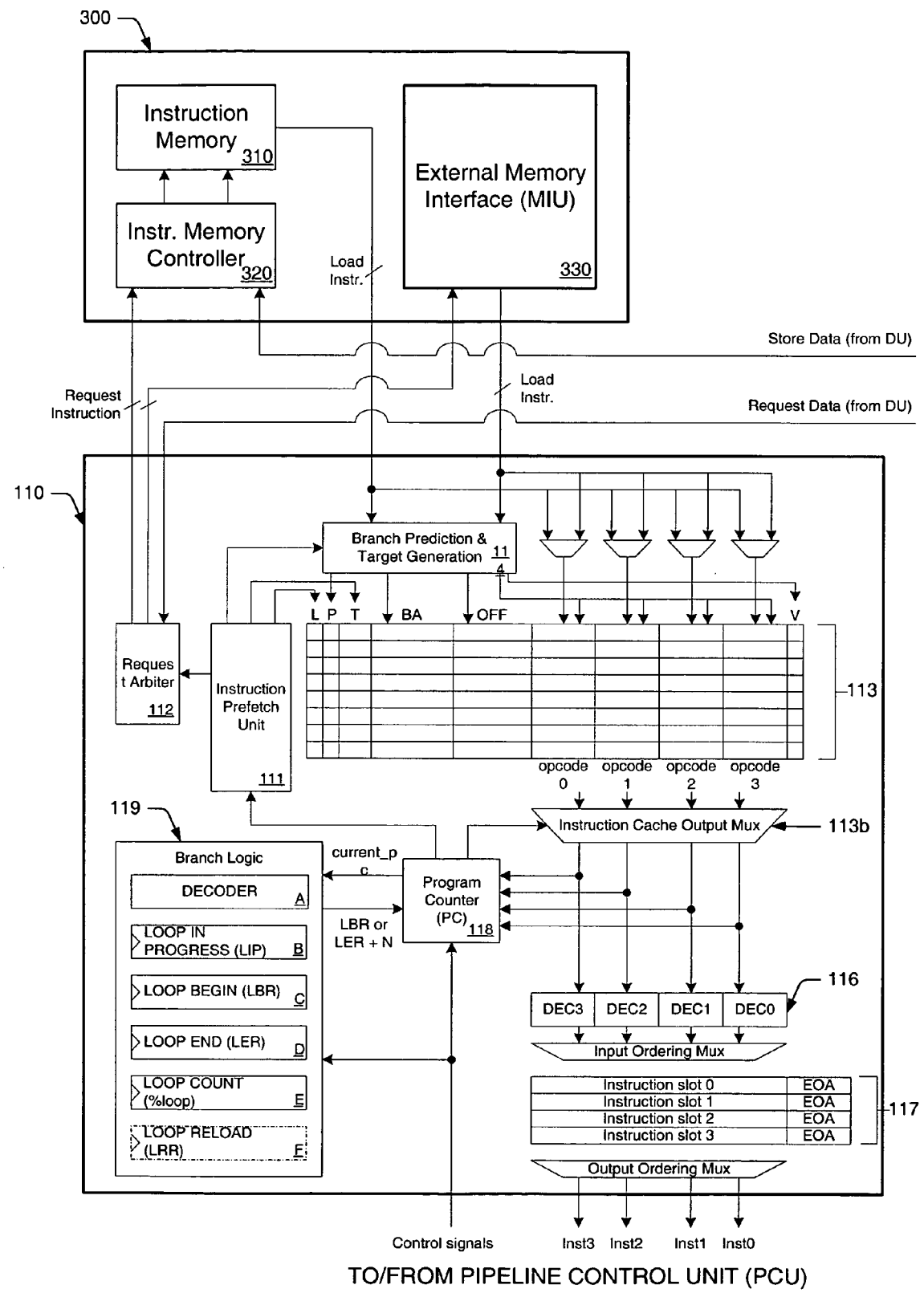
FIG. 3 is a block diagram illustrating one embodiment in which the instruction unit shown in FIG. 1 may be implemented to provide the efficient hardware looping mechanism.

Turning to FIG. 3, various components within instruction unit 110 will now be described in more detail. As noted above, instruction prefetch unit 111 may send a request to request arbiter 112 for retrieving one or more program instructions from external memory 300. As shown in FIG. 3, the program instructions may be retrieved from instruction memory 310 via memory controller 320, or alternatively, from external memory interface 330. The number of program instructions (or "opcodes") that may be retrieved from memory at one time may depend, in some cases, on the issue width of the processor. In the current embodiment, processor core 100 is used to implement a 4-issue superscalar processor; thus, processor core 100 may issue up to four instructions at a time. The program instructions are stored within instruction cache 113 (as opcodes0 . . . 3) during the cache write cycle of the prefetch pipeline (shown in FIG. 2). Though instruction cache 113 is illustrated in FIG. 3 as including eight cache lines, substantially any other number of cache lines may be included in alternative embodiments of the invention.

As shown in FIG. 3, one or more bit fields may be temporarily stored along with the program instructions in cache 113. For example, instruction prefetch unit 111 may set a cache line valid bit (L) and a cache tag field (T) for each cache line stored within the instruction cache. The cache line valid bit (L) indicates whether there is at least one valid instruction word within the cache line, while the cache tag (T) stores the address of the cache line. A cache "hit" or "miss" may be determined by comparing the current program counter (PC) value with the cache tags. If a discontinuity instruction is found within a particular cache line, a branch predicted taken bit (P), a branch instruction address field (BA), a branch offset field (OFF) and a valid field (V) may also be set for that cache line. The valid field (V) indicates which words within the cache line are actually valid. BA is the address of the branch instruction and OFF is the branch offset. For certain branch types, such as conditional branch with immediate branch offset, the branch target is calculated by adding the branch address with the offset. Since a conditional branch can either be predicted as "taken" or "not taken" depending on a specific branch type, the P bit is used to determine whether the branch target or the next instruction(s) in the sequential flow should be prefetched for this particular branch. The P, BA, OFF, and V bit fields may be determined and set by branch prediction and target generation logic block 114. Other bit fields may be included, as necessary.

During the FID stage, the cache controller (FIG. 1) may forward the cached instructions to instruction decoder 116 and program counter (PC) 118 via instruction cache output multiplexor 113b. In some cases, the cached instructions may be forwarded N cache words at a time, where N is substantially equal to the issue width of the processor. The next value pointed to by program counter 118 may be determined based on the grouping information (or "control signals") received from PCU 130. If a discontinuity instruction is detected in the F/D stage, the next value pointed to by the PC may be calculated based on the specific type of the discontinuity instruction. Instruction decoder 116 may decode and store the instructions within instruction queue 117 before the decoded instructions are sent to PCU 130 (as Inst3 . . . 0) for dependency checking and/or instruction grouping during the GR stage. The input and output multiplexors immediately preceding and following instruction queue 117 can be used to maintain a desired order of the instructions stored within the instruction queue.

Though instruction decoder 116 is shown in FIG. 3 as a four-instruction decoder, decoder 116 may be configured somewhat differently in other embodiments of the invention. For example, instruction decoder 116 may be alternatively configured as a two-instruction decoder to simplify the hardware within a 4-issue processor (though this may reduce performance, in some cases) or to accommodate the issue width of a dual-issue processor.

In some cases, the number of slots within instruction queue 117 may be equal to the issue width of the processor. In the embodiment of FIG. 3, for example, instruction queue 117 includes 4 instruction slots (labeled instruction slot 0 . . . 3). However, the instruction queue should not be limited to the number of slots shown in FIG. 3 for all embodiments of the invention. Instruction queue 117 may be configured with a different number of slots, in other embodiments of the invention.

During the F/D stage, one of the instructions selected by the instruction cache output mux 113b may be determined to be a discontinuity instruction. As noted above, the term "discontinuity instruction" may refer to any instruction that diverts program control away from the next instruction immediately following the discontinuity instruction in program sequence. As such, a "discontinuity instruction" may be a loop instruction (e.g., the DO instruction in scalar architectures, or the AGN instruction in superscalar architectures) or a conditional branch instruction (e.g., the BNZ instruction). The terms "discontinuity instruction," "loop instruction," and "branch instruction" may be used interchangeably throughout this discussion.

If a discontinuity instruction is selected by instruction cache output mux 113b, one or more registers may be set within branch logic 119 to initiate the zero-overhead hardware looping mechanism. When dealing with loop instructions, a "zero-overhead looping mechanism" may be described as a hardware component that decides, in parallel with other operations, whether to increment the program counter or branch without cycle time penalty to the top of the loop. A similar determination may be made for conditional branch instructions. To support zero-overhead looping (or branching), branch logic 119 may include an additional instruction decoder 119A for decoding the discontinuity instruction, in addition to a plurality of registers (119B-F) for tracking certain aspects of the discontinuity instruction.

For example, branch logic 119 may include a loop-in-progress register (LIP) 119B to indicate whether a loop (or branch) is currently in progress. Thus, when a discontinuity instruction is written to instruction queue 117, a corresponding bit within LIP register 119B may be set by branch logic 119. LIP register 119B is shown in FIG. 3 as a 4-bit register for supporting up to 4 branch instructions or up to 4 levels of nested loop instructions. LIP register 119B may be configured differently in other embodiments of the invention to include a fewer or greater number of bits. In addition to LIP register 119B, branch logic 119 may also include a loop-begin register (LBR) 119C for storing an address of the first instruction in the loop, a loop-end register (LER) 119D for storing an address of the last instruction in the loop, and at least one loop count register (% loop) 119E for storing the number of iterations in the loop. In a particular embodiment, branch logic 119 may include one loop count register 119E for each bit of the LIP register 119B.

In some cases, branch logic 119 may use the program counter (PC) values and the opcode of the discontinuity instruction to determine the address of the first instruction in the loop, as well as the number of iterations in the loop. For example, if an AGN instruction is dispatched to branch logic 119, and at the same time stored within slot x of instruction queue 117, the address of the first instruction in the loop (or the "branch-begin address") may be determined by adding the branch offset (OFF) of the opcode stored in slot x to the PC value corresponding to slot x. The number of iterations may be explicitly stored within a corresponding loop count register (% loop) using, e.g., a MOV instruction.

Unlike conventional mechanisms, however, branch logic 119 may not use the opcode of the discontinuity instruction to determine the address of the last instruction in the loop (i.e., the "branch-end address"). Instead, branch logic 119 may determine the address of the last instruction based on the type of discontinuity in progress, as well as the position of the discontinuity instruction in the instruction packet output from the instruction cache output mux. For example, if an AGN instruction associated with slot 0 of instruction queue 117 is forwarded from output mux 113b, the last instruction in the loop may be determined to be the instruction immediately preceding the AGN instruction. Therefore, the address of the last instruction may be set by storing, within LER register 119D, the program counter value immediately preceding the current_pc value pointed to by program counter (PC) 118 (i.e., current_pc−1). On the other hand, if the AGN instruction were associated with slot 1 of instruction queue 117, the address of the last instruction could be designated by storing the current_pc value within LER register 119D. Instructions associated with slots 2 and 3 may then be designated by respectively storing current_pc+1 and current_pc+2 within LER register 119D.

Branch logic 119 determines the branch-end address in a completely different manner than conventional looping mechanisms. Consider, for example, the DO loop mechanism commonly used to provide zero-overhead looping within scalar architectures. Similar to branch logic 119, the DO loop mechanism may include various registers for storing a loop count and an address of the last instruction in the DO loop construct. The DO loop mechanism may also include a small hardware stack (typically, two slots deep) for storing the address of the first instruction in the DO loop, i.e., the address of the instruction immediately following the DO instruction.

However, the DO loop mechanism is bounded by many undesirable constraints. For example, the small size of the hardware stack tends to limit the number of nested loops supported by the DO loop mechanism. As noted above, the hardware stack may be two slots deep for supporting a pair of nested loops. Though it is conceivable that a greater number of nested loops could be supported by increasing the size of the stack, doing so may increase the complexity of the mechanism and introduce compatibility issues.

The DO loop mechanism performs end-of-loop comparisons in the F/D stage by comparing the address of the last instruction in the DO loop with the program counter when the third to last instruction is being fetched. For this reason, the DO loop mechanism does not permit discontinuity instructions (or any other instructions which access the program counter registers or modify program flow) to be the last instruction, the second to last instruction, or the third to last instruction in the DO loop construct. In other words, the DO loop mechanism requires that at least three non-branching instructions be executed immediately before the end of loop. In some cases, this requirement may force a program designer to increase the number of instructions in the program by padding the DO loop construct with NOP (no operation) instructions.

The DO loop mechanism may allow a branch-out-of-loop instruction to be placed within the body of a loop if program control does not return to the DO loop (e.g., the ENDDO instruction may be used to reset the DO loop registers before a new DO loop instruction is executed). However, the DO loop mechanism does not allow branch-out-of-loop instructions to be placed within the body of a DO loop to execute, e.g., another DO loop instruction, if program control is to return to the first DO loop construct.

For example, the address of the last instruction in the first DO loop construct (i.e., the branch-end address) is set by the DO loop opcode and stored within an appropriate DO loop register when the first DO loop instruction is initially decoded. The address of the first instruction in the first DO loop construct (i.e., the branch-begin address) may be stored within the hardware stack. If a branch-out-of-loop instruction causes program control to be diverted outside of the first DO loop construct, and a second DO loop instruction is encountered before program control returns to the first DO loop construct, the register storing the branch-end address and the hardware stack storing the branch-begin address will be updated with addresses corresponding to the second DO loop construct. Since the DO loop instruction is not re-executed once program control returns to the first DO loop construct (so as to provide zero-overhead looping), the appropriate branch-end and branch-begin addresses will not be reloaded into the DO loop register and hardware stack, respectively. This will cause the looping mechanism to fail once program control attempts to return to the first DO loop construct.

To overcome the above-mentioned problems, the hardware looping mechanism described herein provides a set of registers (i.e., registers 119A-F), which can be dynamically updated or reloaded as often as needed. In other words, the hardware looping mechanism described herein provides uncommon flexibility and extensibility by allowing substantially any number and/or type of discontinuity instructions to be placed within the body of a loop, and at any location within the loop. The types of discontinuity instructions that may be placed within the body of a loop include nested loop instructions and other branch instructions, which may divert program control to an instruction residing within, or outside of, the loop. The ability to execute "branch-out-of-loop" instructions is a direct result of the manner in which the branch-end address (i.e., the address of the last instruction in the loop) is determined by branch logic 119.

Once the last instruction of the loop is detected by branch logic 119, an end-of-branch (EOB) flag may be stored along with the last instruction in instruction queue 117. As described in more detail below, the EOB flag may be used to provide true zero-overhead looping by enabling subsequent iterations of the loop to be executed upon detection of the EOB flag, instead of detecting the discontinuity instruction responsible for the loop. In other words, the EOB flag enables subsequent iterations of the loop to be executed without re-issuing the discontinuity instruction into the pipeline. This improves processor performance by maintaining the processor issue width and by reducing the number of instructions required to execute the loop. In some cases, use of the EOB flag may eliminate the need for unrolling loops, a technique commonly used to increase processor performance at the cost of increased code density and reduced code readability. It is noted, however, that the system and method described herein may be successfully applied to unrolled code in alternative embodiments of the invention.

In some embodiments of the invention, branch logic 119 may also include a loop reload register (LRR) 119F. The loop reload register may store a copy of the loop count (i.e., the iterative count), so that loop count register 119E may be automatically reloaded after a current loop count has been exhausted. In other words, loop performance may be greatly enhanced by automatically reloading the loop count(s) with the values stored in the loop reload register 119F, as opposed to issuing an additional instruction (and incurring an additional time penalty) to perform such a function. For this reason, LRR 119F may be particularly useful in programs that utilize nested loops, such as DSP algorithms that operate on 2-D data arrays with small inner loops.

Figure 4:
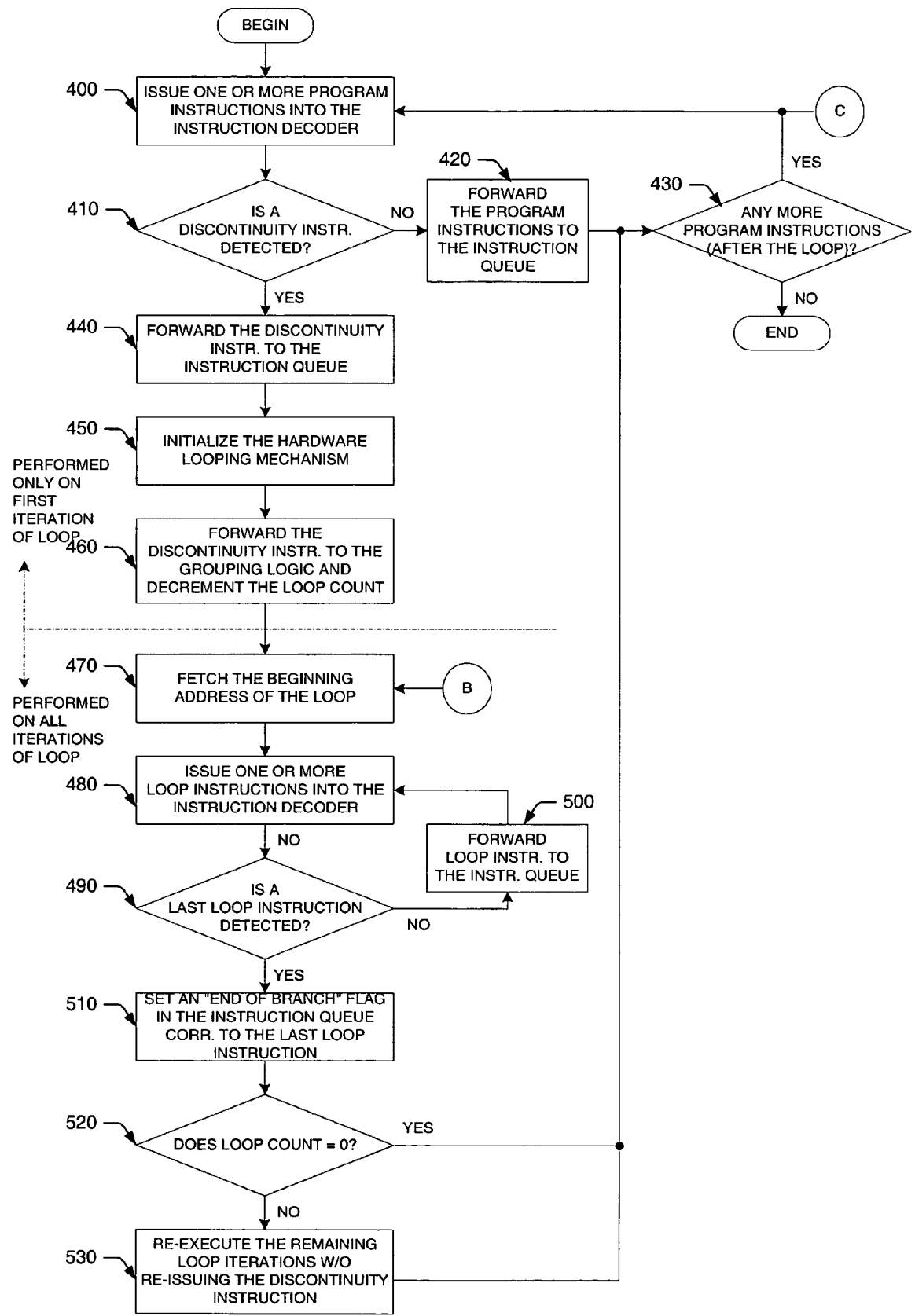
FIG. 4 is a flow chart diagram illustrating an exemplary method for executing a discontinuity instruction using the hardware looping mechanism of FIG. 3.
Figure 5:
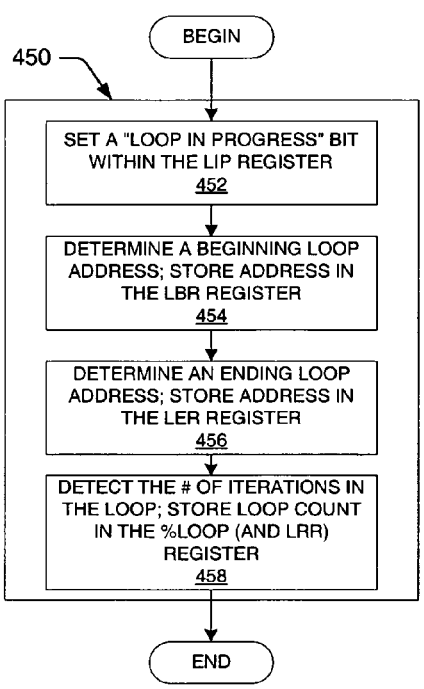
FIG. 5 is a flow chart diagram illustrating an exemplary method for initializing the hardware looping mechanism, as described in the method of FIG. 4.
Figure 6:
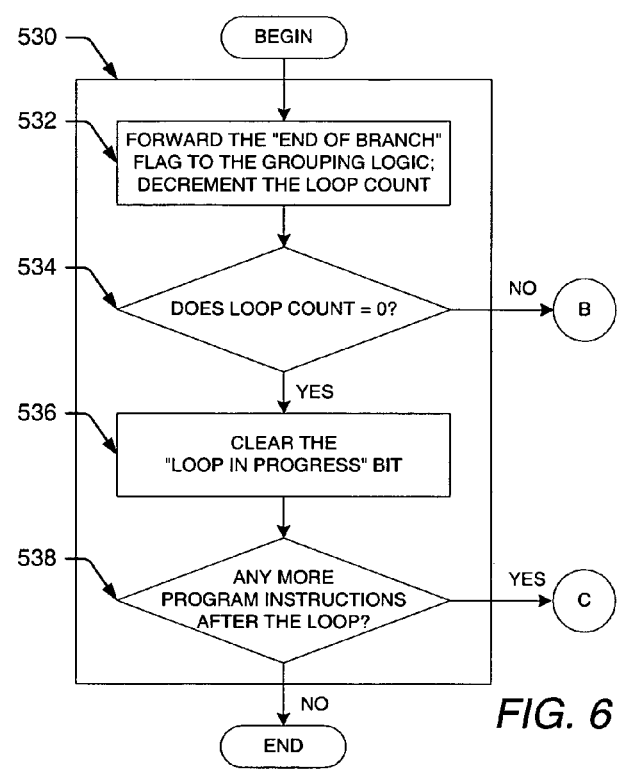
FIG. 6 is a flow chart diagram illustrating an exemplary method for re-executing the remaining loop iterations without re-issuing the discontinuity instruction into the pipeline, as described in the method of FIG. 4.

FIGS. 4-6 illustrate an exemplary method for executing a discontinuity instruction using the zero-overhead looping mechanism described above. Referring to FIG. 4, the method may begin by issuing one or more program instructions into the execution pipeline (in step 400). As noted above, the number of program instructions that may be issued into the pipeline at one time may depend, in some cases, on the issue width of the processor. Next, the method detects whether or not a discontinuity instruction is included among the issued instructions by decoding the instructions (in step 410). The instructions may be decoded by instruction decoder 116 and/or instruction decoder 119A of FIG. 3. If a discontinuity instruction is not detected (in step 410), the decoded instructions are forwarded to the instruction queue (in step 420) and the program sequence is checked for remaining instructions (in step 430). If no more program instructions remain, the method ends; otherwise, the method continues by issuing the next set of program instructions into the execution pipeline (in step 400).

If a discontinuity instruction is detected (in step 410), the discontinuity instruction may be forwarded to the instruction queue (in step 440) and the hardware looping mechanism may be initialized (in step 450) by setting the appropriate bits in one or more registers of the branch logic. For the sake of brevity, the following discussion will assume that a loop instruction, such as the AGN instruction, has been detected in step 410. However, the method described herein may be equally applied to other discontinuity instructions in other embodiments of the invention. FIG. 5 illustrates various steps that may be taken to initialize the hardware looping mechanism (in step 450), according to one embodiment of the invention.

Once a discontinuity instruction is detected, a "loop-in-progress" bit may be set within the LIP register to indicate that a loop is currently in progress (step 452). Next, the address of the first instruction in the loop (i.e., the branch-begin address) is determined and stored within the LBR register (step 454). The address of the last instruction in the loop (i.e., the branch-end address) and the number of iterations in the loop (i.e., the loop count) may also be determined and stored within the LER register (step 456) and the % loop register (step 458), respectively. In some embodiments, a copy of the loop count may be stored within the LRR register so that the loop count may be automatically reloaded into the % loop register, as needed.

Once the looping mechanism is initialized, the discontinuity instruction may be forwarded to the pipeline control unit (in step 460), where it may be checked for dependencies and/or grouped with other instructions. The loop count stored within the % loop register may also be decremented at this time to signify the completion of a first loop iteration. In most cases, steps 410, 440, 450 and 460 may be performed only once for all iterations of the loop. In other words, once the looping mechanism is initialized, the instructions within the loop can be executed repeatedly without issuing the discontinuity instruction back into the pipeline. This may significantly improve processor performance by maintaining the processor issue width and by reducing the number of instructions required to execute a program.

To initiate the next iteration, the address of the first instruction in the loop (i.e., the branch-begin address) is fetched (in step 470), so that one or more loop instructions may be issued into the pipeline (in step 480). The method then detects whether or not a last loop instruction is included among the issued instructions by decoding the instructions (in step 490). The last loop instruction may be detected by comparing the address of the current instruction(s) in the F/D pipeline stage with the branch-end address stored within the LER register. If the last loop instruction is not detected (in step 490), the loop instruction(s) are forwarded to the instruction queue (in step 500) and the next set of loop instructions are issued into the pipeline (in step 480). If the last loop instruction is detected, however, an "end-of-branch" flag may be set in the instruction queue along with the last loop instruction (in step 510). The "end-of-branch" flag may be used, in place of the discontinuity instruction, to signify the end of a loop iteration.

If the loop count is exhausted (in step 520), the method determines whether any more program instructions remain (in step 430). If none remain, the method ends; otherwise, the method continues by issuing the next set of program instructions into the execution pipeline (in step 400). On the other hand, if the method determines that the loop count is not exhausted (in step 520), the remaining iterations of the loop may be re-executed without re-issuing the discontinuity instruction into the pipeline (in step 530). FIG. 6 illustrates various steps that may be taken to re-execute the remaining iterations of the loop (in step 520), according to one embodiment.

After the end-of-branch flag is set in the instruction queue, the end-of-branch flag may be forwarded along with the last loop instruction to the pipeline control unit (in step 532). During the grouping stage, any instruction tagged with an end-of-branch flag will be subject to the same grouping rules as the discontinuity instruction detected in step 410. This enables the end-of-branch flag to essentially replace the discontinuity instruction in subsequent iterations of the loop, thereby removing the need to re-issue the discontinuity instruction into the pipeline. After the last loop instruction is grouped, the end-of-branch flag is cleared and the loop count is decremented (in step 532). If more iterations remain (in step 534), steps 470-532 are repeated for each new iteration of the loop. Otherwise, the "loop-in-progress" bit may be cleared (in step 536) to indicate that the loop is no longer in progress. If any more program instructions remain after the loop (in step 538), the method continues by issuing the next set of program instructions into the pipeline (in step 400); otherwise, the method ends.

In general, the method described herein improves processor performance by significantly reducing the number of times a given discontinuity instruction is issued into the pipeline. By limiting the number of times a given discontinuity instruction is issued, the method enables one or more instructions to be issued in place of the discontinuity instruction. This tends to reduce the number of instructions required to execute a program, which in turn, reduces the overall time and power consumed by the processor during program execution.

Examples of program code execution are provided in FIGS. 7-10 to illustrate some of the many advantages provided by the present invention. For example, FIGS. 7 and 8 illustrate how the hardware looping mechanism and method described herein may be applied to a tight loop (FIG. 7), and the substantial time savings incurred over conventional tight loop methods (FIG. 8). FIGS. 7 and 8 also demonstrate how the method may be applied to existing program code without requiring the program code to be modified. This enables the invention to be backward compatible with existing programs. A nested loop example is described in reference to FIG. 9, while exemplary code is provided to illustrate how various "branch-out-of-loop" instructions may be handled by the hardware looping mechanism. It is noted that only two instructions are issued per pipeline cycle in the examples of FIGS. 7-9. For this reason, we may assume that the tight loop is executed within a dual-issue processor. This may not always be the case. However, one skilled in the art would recognize how the execution may change if the code were executed within a processor of substantially different issue width.

EXAMPLE #1

A "Tight" Loop

In general, a "tight" loop may be described as a set of program instructions containing a relatively small number of loop instructions. Due to the relatively small number of instructions included, all "tight" loop instructions may be grouped and executed in the same processor cycle. As shown in FIGS. 7 and 8, for example, a "tight" loop may include two loop instructions (i0, i1) followed by the Again instruction (agn0). A lesser or greater number of tight loop instructions may be included in alternative embodiments.

FIG. 8 illustrates how the tight loop may be executed in accordance with a conventional method. As shown in FIG. 8, the first two loop instructions may begin a first iteration of the loop upon entering the F/D stage during a first cycle of the pipeline (i.e., cycle 'n'). Since only two instructions reside within the loop, the first iteration ends when the agn0 instruction is detected in the F/D stage during the second cycle of the pipeline (i.e., cycle 'n+1'). On the second iteration of the loop, the agn0 instruction is forwarded to the GR stage, the loop count is decremented, and loop instructions i0 and i1 are re-issued into the pipeline (in cycle 'n+2'). The second iteration ends when the agn0 instruction is detected for a second time in the fourth cycle of the pipeline (i.e., cycle 'n+3'), and the process continues until the loop count is exhausted.

FIG. 7 illustrates how the tight loop may be executed in accordance with an embodiment of the present invention. After the first two instructions are issued (in cycle 'n') and the agn0 instruction is detected (in cycle 'n+1'), the hardware looping mechanism is initialized by setting the "loop-in-progress" bit in the LIP register and storing the beginning and ending addresses of the loop in the LBR and LER registers, respectively. On the second iteration of the loop, the agn0 instruction is forwarded to the GR stage, the loop count is decremented, and instructions i0 and i1 are re-issued into the pipeline (in cycle 'n+2'). Since only two instructions reside within the loop, the second iteration ends after the last instruction in the loop (instruction i1) is tagged with the "end-of-branch" flag. On the third iteration of the loop, the "end-of-branch" flag is forwarded along with the last loop instruction to the GR stage, the loop count is decremented, instructions i0 and i1 are re-issued into the pipeline (in cycle 'n+3'), and the process continues until the loop count is exhausted.

Because the conventional method re-issues the agn0 instruction into the pipeline at the end of each iteration (FIG. 8), it requires twice as many pipeline cycles to execute one iteration of the small loop, than the number of pipeline cycles used in the present method (FIGS. 4-7). In other words, the conventional method unnecessarily reduces the issue width of the processor (e.g., up to 50% in dual-issue processors) by re-issuing the agn0 instruction for each new iteration of the loop. In contrast, the method described herein may execute subsequent iterations of the loop instructions without re-issuing the agn0 into the pipeline. As a consequence, the present method may provide a means for maintaining a maximum issue width of the processor at all times. The maximum issue width may be maintained regardless of the number of instructions within the loop or the actual issue width of the processor.

EXAMPLE #2

A Nested Loop

As noted above, the hardware looping mechanism and method described herein may be applied to any number and/or type of discontinuity instructions. FIGS. 9A and 9B illustrate one manner in which a nested loop may be handled by the hardware looping mechanism. In other words, FIGS. 9A and 9B illustrate how a "branch-within-the-loop" instruction may be handled. As shown in FIG. 9A, inner and outer loops may each be provided with two instructions. In the embodiment of FIG. 9B, the inner loop (containing loop instructions i2, i3 and the agn0 instruction) may be implicitly executed without re-issuing the agn0 instruction into the pipeline for each new iteration of the inner loop. The implicit execution of the inner loop is illustrated in FIG. 9B during pipeline cycles n+2, n+3, n+4, and again during pipeline cycles n+8, n+9, n+10. During these cycles, the end-of-branch flag is used, in place of the agn0 instruction, to signify the completion of an iteration. However, and as shown in FIG. 9B, the outer loop (containing loop instructions i0, i1 and the agn1 instruction) may be executed in the conventional manner by re-issuing the agn1 into the pipeline for each new iteration thereof. The explicit execution of the outer loop occurs when the agn1 instruction is re-issued into the pipeline during cycles n+5 and n+11 of FIG. 9B.

In the embodiment of FIG. 9B, the hardware looping mechanism is only used for executing one of a pair of nested loops (e.g., the inner loop). In other embodiments, the hardware looping mechanism may be configured for executing only the outer loop, both the inner and outer loops, or more than two nested loops. For example, branch logic 119 of FIG. 3 may include an additional set of registers (119B-F) for each additional loop to be supported.

EXAMPLE #3

A Branch-Out-of-Loop Instruction Near the End of a Loop Construct

The following program code illustrates some of the limitations placed on the DO looping mechanism:

| | |
|---|---|
| DO #3, OuterLoop | ; beginning of outer loop |
| PUSH LC | ; save the loop count (LC) |
| PUSH LA | ; save the loop address (LA) |
| DO X0, InnerLoop | ; beginning of inner loop |
| (instructions) | |
| ASL A | ; arithmetic shift left |
| (instructions) | |
| InnerLoop: | ; end of inner loop |
|   ADD A, B | ; add two accumulators |
|   POP LA | ; retrieve the last address of the outer loop |
|   POP LC | ; retrieve the loop count of the outer loop |
|   NOP | ; three NOP instructions are required so that LC |
|   NOP | ; can be properly updated before it is decremented |
|   NOP | ; by the last instruction. |
| OuterLoop: | ; end of outer loop |

First of all, the DO looping mechanism requires at least three NOP (no operation instructions) to be included after the POP LC instruction. This requirement is enforced to ensure that there is ample time to update the loop count before it is decremented by the last instruction in the outer loop (i.e., the last NOP instruction). For this reason, the DO loop mechanism does not allow discontinuity instructions to be placed near the end of the loop. If discontinuity instructions were placed near the end of the loop, there may be insufficient time to update loop count, which would cause the looping mechanism to fail. It is also noted that extra instructions are needed to store (i.e., PUSH) and retrieve (i.e., POP) the loop count and the last address.

The exemplary program code presented below illustrates how a "branch-out-of-loop" instruction (or any other discontinuity instruction) may be arranged near the end of a loop construct without causing the looping mechanism to fail. This provides greater flexibility in program code generation, as compared to the limitations placed on the DO looping mechanism. The following code segment searches a six-element memory array for a value of 3. If a value of 3 is found in the memory array, the remaining elements in the array are cleared.

| Memory Array Before Code Execution: | Memory Array After Code Execution: |
|---|---|
| mem[100] = 1 | mem[100] = 1 |
| mem[101] = 2 | mem[101] = 2 |
| mem[102] = 3 | mem[102] = 3 |
| mem[103] = 4 | mem[103] = 0 |
| mem[104] = 5 | mem[104] = 0 |
| mem[105] = 6 | mem[105] = 0 |
| Program Code: | |
| !Initialize the loop | |
| MOV %loop0, 5 | ; set %loop0 = 5 to execute the loop 6 times |
| MOV r0, 3 | ; set general purpose register r0 = 3 |
| MOV r15, 100 | ; set the address pointer to first element in array |
| MOV r2, 0 | ; set general purpose register r2 = 0 |
| !%loop0 equals 5 upon entering the First_Loop | |
| First_Loop: | |
|   LD r1, r15, 1 | ; load an element into register r1 |
|   CMP r1, r0 | ; compare registers r1 and r0 |
|   BZ Second_Loop | ; if r1 == 3, go to Second_Loop |
|   AGN0 First_Loop | ; implicit looping mechanism may/may not be activated |
| !%loop0 equals 3 upon entering the Second_Loop | |
| Second_Loop: | |
|   STU r2, r15, 1 | ; clear the current element in the memory array |
|   AGN0 Second_Loop | ; implicit looping mechanism activated after first iteration |

As shown in the exemplary code provided above, a conditional branch instruction (e.g., BZ Second_Loop) may be placed anywhere within the loop, including the location of the last instruction before the end of the loop. In addition, because the necessary loop counts and addresses are stored upon detection of the AGN0 instruction, no additional instructions are required to do so. Therefore, the improved hardware looping mechanism described herein provides enhanced flexibility and code density, as compared to the conventional DO looping mechanism.

EXAMPLE #4

A Branch-Out-of-Loop Instruction that Causes Program Control to Encounter Another Loop Instruction Before Returning to the Previous Loop Instruction As noted above, the DO looping mechanism does not allow branch-out-of-loop instructions to be placed within the body of a DO loop to execute, e.g., another DO loop instruction, if program control is to return to the first DO loop construct. In other words, the second DO loop instruction updates the stack with it's own branch-begin address and changes the branch-end address stored in the DO loop register. This would cause the DO looping mechanism to fail if program control were to return to the first DO loop construct.

The exemplary program code presented below illustrates how a "branch-out-of-loop" instruction may allow a second loop instruction to be executed before program control is successfully returned to the first loop construct. The following code segment searches for the values 3 and 6 in a nine-element memory array. It replaces values 3, 4, and 5 with a 0, and doubles the values of the remaining elements.

| Memory Array Before Code Execution: | Memory Array After Code Execution: |
|---|---|
| mem[100] = 1 | mem[100] = 2 |
| mem[101] = 2 | mem[101] = 4 |
| mem[102] = 3 | mem[102] = 0 |
| mem[103] = 4 | mem[103] = 0 |
| mem[104] = 5 | mem[104] = 0 |
| mem[105] = 6 | mem[105] = 12 |
| mem[106] = 7 | mem[103] = 14 |
| mem[107] = 8 | mem[104] = 16 |
| mem[108] = 9 | mem[105] = 18 |

```
Program Code:
!Initialize the loop
MOV %loop0, 8              ; set %loop0 = 8 to execute the loop 9 times
MOV r0, 3                  ; set general purpose register r0 = 3
MOV r15, 100               ; set the address pointer to first element in array
MOV r2, 6                  ; set general purpose register r2 = 6
MOV r3, 0                  ; set general purpose register r3 = 0
!%loop0 equals 8 upon entering the First_Loop
First_Loop:
    LD r1, r15, 1          ; load an element into register r1
    CMP r1, r0             ; compare registers r1 and r0
    BZ Second_Loop         ; if r1 == 3, goto Second_Loop
Cont_First_Loop:
    ADD r1, r1             ; double the value of the element in r1
    ST r1, r15             ; update the current element in the array
    AGN0 First_Loop        ; implicit looping mechanism activated after first iteration
!Unconditional branch executed after the First_Loop is complete
BR end_test                ; goto the end of the test
!%loop0 equals 6 upon entering the Second_Loop
Second_Loop:
    CMP r1, r2             ; compare r1 with 6
    BZ Cont_First_Loop     ; continue the first loop
    STU r3, r15            ; clear the current element in the memory array
    LDU r1, r15, 1         ; get the next element in the memory array
    AGN0 Second_Loop       ; implicit looping mechanism activated after first iteration
```

As shown in the exemplary code provided above, the hardware looping mechanism described herein allows program control to return to a previous loop construct, even if a second loop instruction is encountered before doing so. This may be due, at least in part, to the dynamic nature of the branch logic registers. In other words, enhanced flexibility is provided by allowing the branch logic registers to be dynamically updated with the appropriate address and loop count values, as often as needed. The current example may also apply to hardware/software interrupts, which may temporarily divert program control outside of the loop.

It will be appreciated to those skilled in the art having the benefit of this disclosure that this invention is believed to provide an improved hardware looping mechanism for both scalar and superscalar processor architectures. The improved hardware looping mechanism described herein may provide zero-overhead looping for substantially any number, type and/or arrangement of discontinuity instructions. Further modifications and alternative embodiments of various aspects of the invention will be apparent to those skilled in the art in view of this description. It is intended that the following claims be interpreted to embrace all such modifications and changes and, accordingly, the specification and drawings are to be regarded in an illustrative rather than a restrictive sense.

What is claimed is:

1. A method for executing discontinuity instructions within a processor, wherein the method is performed by a looping mechanism and comprises the steps of:

issuing one or more program instructions at a time into a first pipeline stage;

detecting whether a first discontinuity instruction is included among the issued program instructions, wherein if a first discontinuity instruction is detected, the method further comprises:

executing one or more instructions associated with the first discontinuity instruction until a last instruction of the one or more instructions is detected and marked with an end-of-branch flag, wherein the end-of-branch flag is stored along with the last instruction within an instruction queue; and re-executing the one or more instructions for all subsequent iterations of the one or more instructions upon detecting the end-of-branch flag, wherein the step of re-executing is performed without re-issuing the first discontinuity instruction into the first pipeline stage.

2. The method of claim 1, wherein the step of re-executing enables an effective issue width of the processor to remain equal to a maximum number of instructions that can be issued into the first pipeline stage during a single pipeline cycle.

3. The method of claim 1, wherein after the step of detecting and prior to the step of executing, the method further comprises storing a branch-in-progress flag within a first register, a branch-begin address within a second register, and a branch-end address within a third register, and wherein the branch-in-progress flag, the branch-begin address and the branch-end address can be dynamically updated during the steps of executing and re-executing, if necessary.

4. The method of claim 3, wherein after the step of detecting and prior to the step of executing, the method further comprises decrementing a loop count stored within a fourth register.

5. The method of claim 4, wherein during the step of re-executing, the method further comprises:
   clearing the end-of-branch flag within the instruction queue;
   decrementing the loop count within the fourth register;
   fetching the branch-begin address from the second register;
   issuing one or more instructions, which are pointed to by the branch-begin address and associated with the first discontinuity instruction, into the first pipeline stage; and
   detecting whether or not the last instruction is included among the issued instructions, wherein if the last instruction is detected, the step of re-executing further comprises repeating the steps of clearing the end-of-branch flag, decrementing the loop count, fetching the branch-begin address and issuing two or more instructions, until the loop count is exhausted.

6. The method of claim 4, wherein the first discontinuity instruction is a loop instruction, and wherein during the step of executing, the method further comprises detecting whether a second discontinuity instruction is included among the issued program instructions.

7. The method of claim 6, wherein if the second discontinuity instruction is detected and determined to be a nested loop instruction, the method further comprises:
   executing one or more nested instructions associated with the second discontinuity instruction until a last instruction of the nested instructions is detected and marked with a second end-of-branch flag; and
   re-executing the one or more nested instructions for all subsequent iterations thereof upon detecting the second end-of-branch flag, wherein the step of re-executing the nested instructions is performed without re-issuing the second discontinuity instruction into the first pipeline stage.

8. The method of claim 6, wherein if the second discontinuity instruction is detected and determined to be a conditional branch instruction, the method further comprises maintaining or deactivating the looping mechanism even when: (i) whether the second discontinuity instruction diverts program control to an instruction within, or outside of, the one or more instructions associated with the first discontinuity instruction, or (ii) whether or not the second discontinuity instruction is the last instruction of the one or more instructions.

9. A processor having an instruction unit capable of decoding at least one program instruction per pipeline cycle, wherein the instruction unit comprises:
   an instruction decoder configured for receiving the program instructions, decoding the program instructions, and detecting whether or not a first discontinuity instruction is included among the decoded instructions;
   branch logic configured for determining a branch-begin address and a branch-end address of the first discontinuity instruction, if the first discontinuity instruction is detected among the decoded instructions, wherein the determination of the branch-end address is not based on an opcode of the first discontinuity instruction; and
   further comprising an instruction queue configured for storing the decoded instructions, wherein if the first discontinuity instruction is detected among the decoded instructions, the instruction queue is further configured for marking one of the decoded instructions with an end-of-branch flag to indicate that a last instruction of a plurality of instructions associated with the first discontinuity instruction has been detected by the instruction decode.

10. The processor of claim 9, wherein if the first discontinuity instruction is detected among the decoded instructions, the branch logic is further configured for:
    storing a branch-in-progress flag within a first register of the branch logic;
    storing the branch-begin address within a second register of the branch logic, wherein the determination of the branch-begin address is based on a program counter value and the opcode of the first discontinuity instruction; and
    storing the branch-end address within a third register of the branch logic, wherein the determination of the branch-end address is based on a type of the first discontinuity instruction and a location of the first discontinuity instruction within the instruction queue.

11. The processor of claim 10, wherein if the first discontinuity instruction is detected among the decoded instructions, the branch logic is further configured for determining the number of iterations associated with the branch instruction and storing the number of iterations within a fourth register of the branch logic as a loop count.

12. The processor of claim 11, wherein a copy of the loop count is stored within a fifth register of the branch logic for automatically reloading the fourth register once the loop count is exhausted.

13. The processor of claim 9, wherein the branch logic is further configured for allowing a second discontinuity instruction to be included among the plurality of instructions associated with the first discontinuity instruction, wherein the second discontinuity instruction diverts program control outside of the plurality of instructions before a last iteration of the plurality of instructions has been completed.

14. The processor of claim 13, wherein the branch logic is further configured for allowing any number of discontinuity instructions to be included among the plurality of instructions associated with the first discontinuity instruction.

15. The processor of claim 13, wherein the second discontinuity instruction is the last instruction of the plurality of instructions associated with the first discontinuity instruction.

16. The processor of claim 13, wherein if the second discontinuity instruction is detected among the plurality of instructions:
    the branch logic is further configured for clearing the branch-in-progress flag stored within the first register of the branch logic, and once program control returns to the second discontinuity instruction, issuing one or more program instructions to the instruction decoder beginning with the next instruction after the second discontinuity instruction; and
    the instruction decoder is further configured for decoding the issued program instructions, and detecting whether the first discontinuity instruction is included among the decoded instructions for a second time.

17. The processor of claim 16, wherein after the branch-in-progress flag is cleared within the first register and before program control returns to the second discontinuity instruction, the branch logic is further configured for storing a second branch-in-progress flag, a second branch-begin address and a second branch-end address within another set of registers included within the branch logic.

18. The processor of claim 16, wherein if the first discontinuity instruction is detected among the decoded instructions for the second time:
 the branch logic is further configured for repeating the steps of storing the branch-in-progress flag, the branch-begin address, the branch-end address and the loop count; and
 the instruction queue is further configured for re-marking the last instruction with the end-of branch flag once the last instruction is again detected by the instruction decoder.

19. The processor of claim 18, wherein the first, second, third and fourth registers within the branch logic are dynamically reloaded once the first discontinuity instruction is detected for the second time.

20. The method of claim 6, wherein the second discontinuity instruction is a last instruction of the one or more instructions associated with the first discontinuity instruction.

* * * * *